Oct. 19, 1965    K. A. BERGSTEDT    3,212,349
DRIVE MECHANISM
Filed Nov. 21, 1962    8 Sheets-Sheet 2

INVENTOR.
KARL ABDON BERGSTEDT
BY
ATTORNEYS

Oct. 19, 1965  K. A. BERGSTEDT  3,212,349
DRIVE MECHANISM

Filed Nov. 21, 1962  8 Sheets-Sheet 5

INVENTOR.
KARL ABDON BERGSTEDT
BY
Baldwin & Martin
ATTORNEYS

INVENTOR.
KARL ABDON BERGSTEDT
BY
Baldwin & Martin
ATTORNEYS

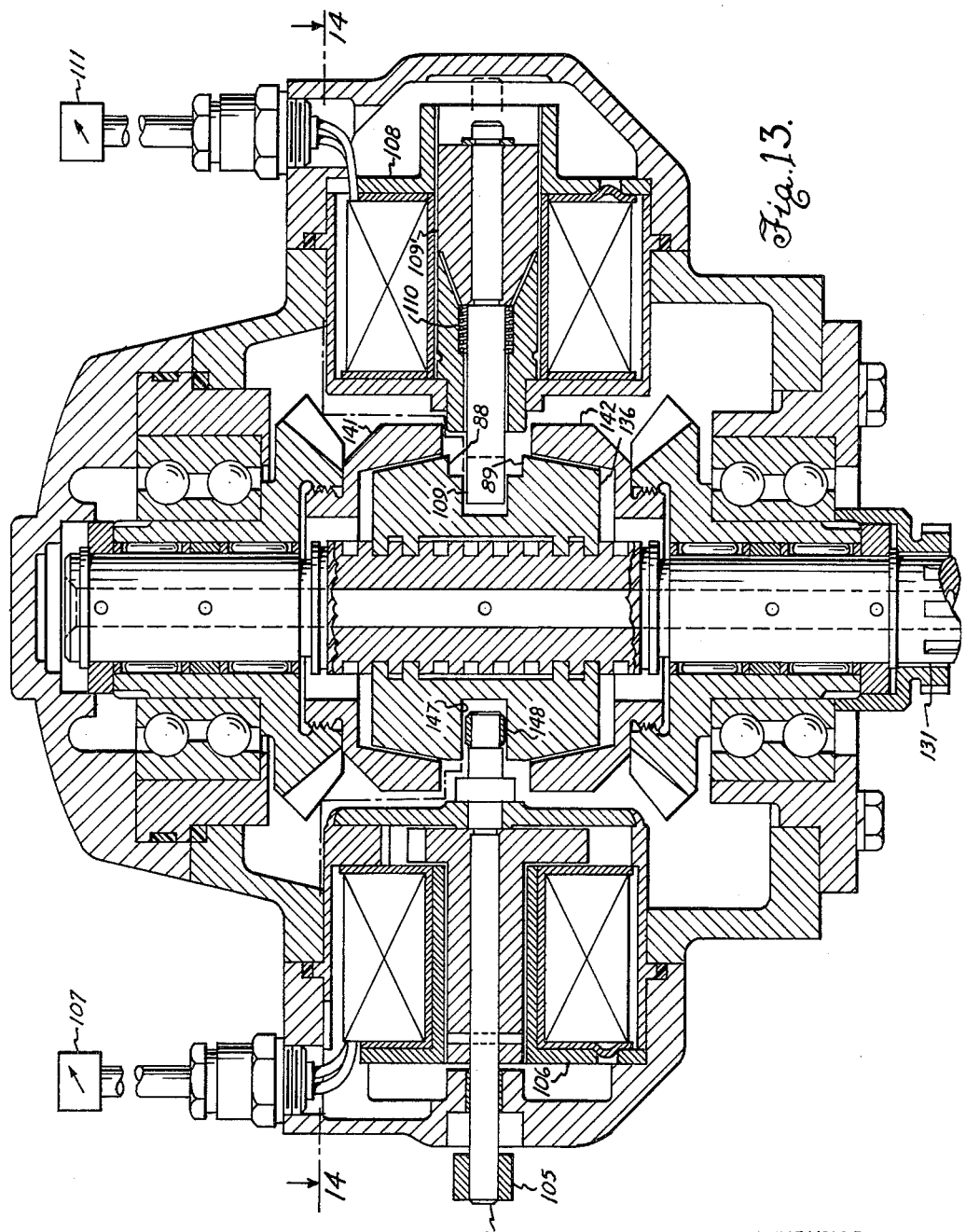

Oct. 19, 1965  K. A. BERGSTEDT  3,212,349
DRIVE MECHANISM

Filed Nov. 21, 1962  8 Sheets-Sheet 8

INVENTOR.
KARL ABDON BERGSTEDT
BY
Baldwin & Martin
ATTORNEYS

United States Patent Office 3,212,349
Patented Oct. 19, 1965

3,212,349
DRIVE MECHANISM
Karl A. Bergstedt, Goteborg, Sweden, assignor to
AB Penta, Goteborg, Sweden
Filed Nov. 21, 1962, Ser. No. 247,428
Claims priority, application Sweden, Nov. 24, 1961,
11,722/61
10 Claims. (Cl. 74—378)

This invention relates to drive mechanisms, and particularly to reversing drive mechanisms. The invention is particularly applicable to boat drives and has important advantages in connection with outboard drive units driven by inboard engines, and in similar applications.

A general object of the invention is to provide an improved clutch mechanism.

A more specific object of the invention is to provide a reversing clutch mechanism, particularly adapted for inclusion in an outboard drive unit for an inboard engine boat.

Another object of the invention is to provide a reversing clutch mechanism readily operable between forward, neutral and reverse positions while the engine shaft connected to the clutch is rotating at substantial speed, and while the propeller or other load is stationary or rotating in a forward or reverse direction.

In boat drive systems of the type in which this invention has particular applicability, dog and friction clutches have been employed in reversing arrangements. Dog clutches operate with a jerk when engaged, particularly when engine speed is high. Friction clutches require a considerable amount of power for actuation and are not, therefore, well suited to remote control. An important specific object of this invention, accordingly is to provide a smooth and positive reversing clutch mechanism operable with a small amount of force, and thus particularly adapted for remote control.

A still further object of the invention is to provide improved means for operating a reversing clutch, including means adapted to remote operation.

Since this invention finds particular applicability to boat drives of the inboard-outboard type, as, for example, that shown and described in U.S. Patent No. 3,006,311, Nils Hansson et al., issued October 31, 1961, particularly in FIGS. 1, 3, 6 and 7 thereof, it is shown herein as included in a unit of this type, but it is to be understood that the utility of the drive mechanism is not limited to outboard drive units.

The novel features which are believed to be characteristic of this invention are set forth with particularity in the appended claims. The invention itself, however, both as to its organization and method of operation, together with further objects and advantages thereof, may best be understood by reference to the following description taken in connection with the accompanying drawing, in which:

FIG. 7 is a detail sectional view of elements included in each embodiment of the invention;

FIG. 8 is a fragmentary view on an enlarged scale showing a small portion of one of the elements of FIG. 7;

FIG. 13 is a front sectional view similar to FIG. 5 showing the reversing mechanism according to a first modified embodiment of the invention;

Figure 1:
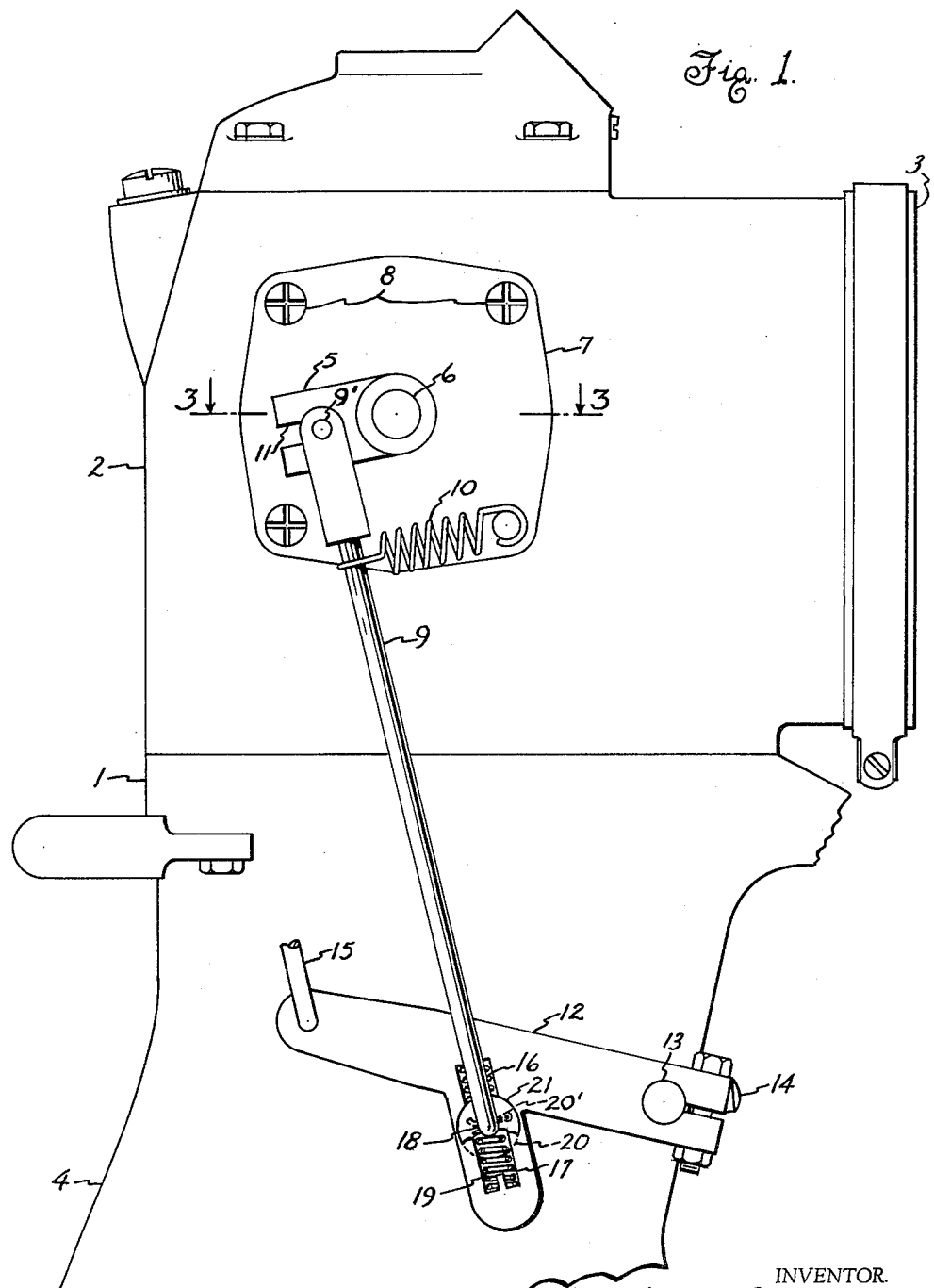
FIG. 1 is a fragmentary starboard side elevation showing an upper end portion of an outboard drive unit including a housing and parts of an operating mechanism for the drive mechanism according to the invention.

As seen in FIG. 1, a preferred arrangement according to the invention includes an outboard housing 1 having an upper end portion 2. The forward upper portion 3 of the housing faces the boat transom and a shaft for driving the unit enters portion 2 from the direction of the transom, these parts being omitted since they are shown and described in the aforementioned patent which patent further shows a propeller arranged on a part of housing 1 extending below intermediate body portion 4 thereof.

Control elements for operating the clutch and reversing mechanism of the invention may comprise an arm 5 fixed to a shaft 6 which enters housing portion 2 through a cover place 7 bolted by bolts 8 to the housing. Control rod 9 carries a pin 9' which by means of a tension spring 10 engaged with the rod, is retained in operative engagement in a slot 11 of the arm, being slidable along the slot with extension of the spring 10. Control rod 9 is connected for raising and lowering to a lever 12 pivoted to the housing by pivot 13. Lever 12 may include a reverse lock tab for the housing as shown at 14, and further described in said patent. A remote control rod or cable element 15 connects to lever 12 to swing the lever on pivot 13 and thus to raise and lower rod 9 and, through arm 5, to rotate shaft 6. The conection of rod 9 to lever 12 is preferably through compression springs 16 and 17 which tend to maintain the lower end portion 18 of the rod centered in socket or slot 19 of lever 12, and which function as spring-loaded lost-motion connecting means between the lever and rod. Washers 20 and 21 are fixed on rod portion 18 and lie against opposite faces of the lever 12 to hold the end portion in the socket. Washer 20 may be suitably held to rod 9 by a cotter pin 20' and may be removable to permit disassembly.

Even though the springs 16 and 17 were replaced by a fixed pivot connection between rod 9 and lever 12, lost motion is afforded by spirng 10 and slot 11. When lever 12 is raised to swing tab 14 downward and to swing arm 5 upward, the slot 11 is inclined upwardly away from lever 12. Now, if rod 9 is raised beyond the point at which arm 5 has reached its upper limit position, pin 9' may travel outwardly along slot 11 while stretching spring 10. Similarly, when rod 9 is lowered from its neutral position shown in FIG. 1, arm 5 swings downward and, upon the arm 5 reaching its lower limit position, further downward movement of rod 9 would cause pin 9' to move outwardly along slot 11 stretching spring 10. Spring 10, accordingly, permits coupling of the clutch reversing mechanism for operation to maneuvering controls which are not precisely adjusted to give exactly the desired extent of movements for clutch control, as do springs 16 and 17 when they are employed.

Figure 2:
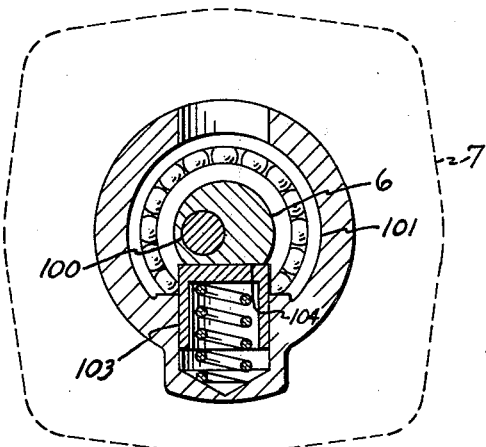
FIG. 2 is a detail sectional view taken along line 2—2 of FIG. 3 showing details of portions of the control means.
Figure 3:
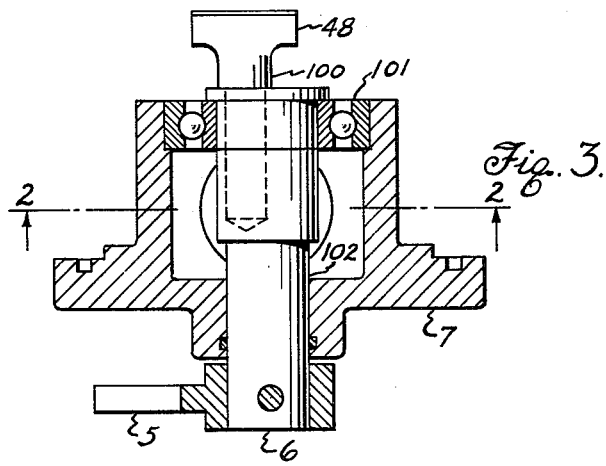
FIG. 3 is a detail sectional view taken along line 3—3 of FIG. 1 also showing portions of the control means of FIGS. 1 and 2.

As seen in FIGS. 2 and 3 the swingable arm 5 mounted on shaft 6 is affixed through the medium of the shaft to a shoe 48 in a manner to cause the shoe to be raised and lowered in response to swinging of the arm. The shoe is pivotally mounted on a short shaft 100 journalled in shaft 6 in offset or eccentric relation. The shaft 100, therefore, is moved along an arc as shaft 6 is rotated on its bearings 101 and 102. The shoe 48 is free to rotate on the axis of its mounting shaft 100 whereby it may assume a horizontal position regardless of the position of shaft 6.

Spring loaded detent means 103 are provided connected to plate 7 and bearing against shaft 6 serving to establish a neutral position of the shaft in cooperation with flat portion 104 thereof. Such means yield when arm 5 is swung up or down to shift to forward or reverse drive of the propeller.

Figure 4:
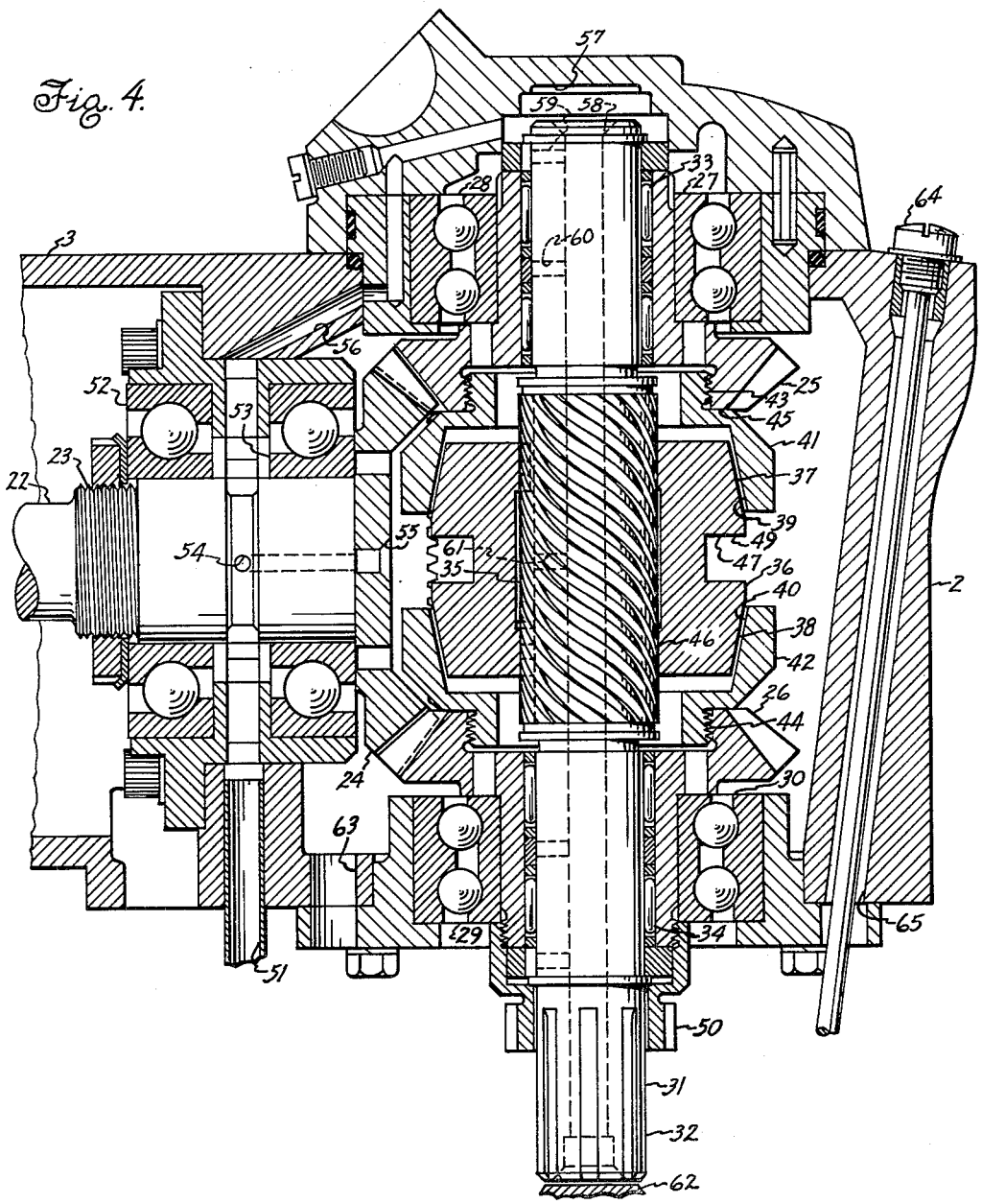
FIG. 4 is a sectional view, taken from the port side generally along line 4—4 of FIG. 5.
Figure 5:
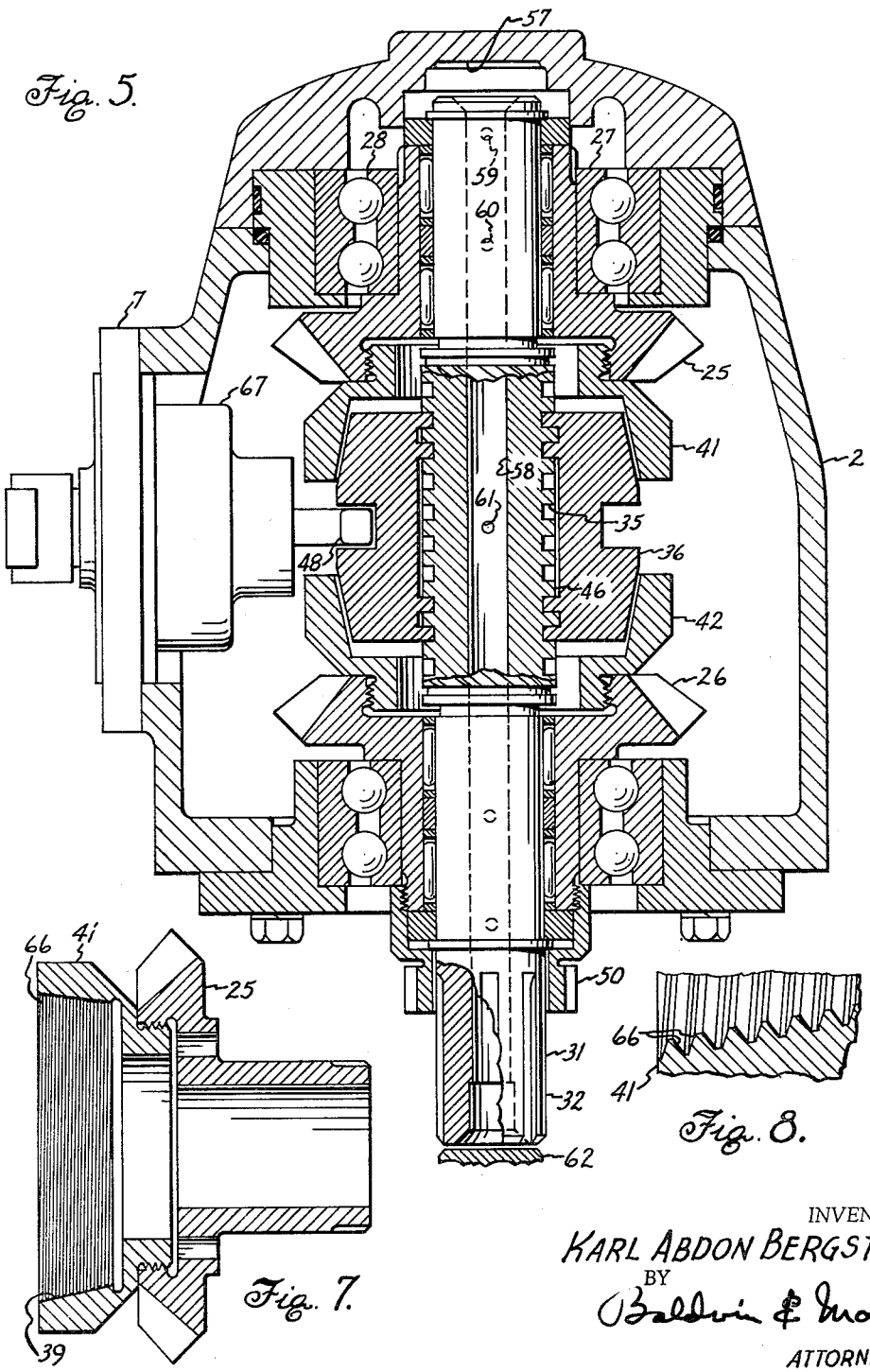
FIG. 5 is a sectional view taken from the front generally along line 5—5 of FIG. 4.
Figure 6:
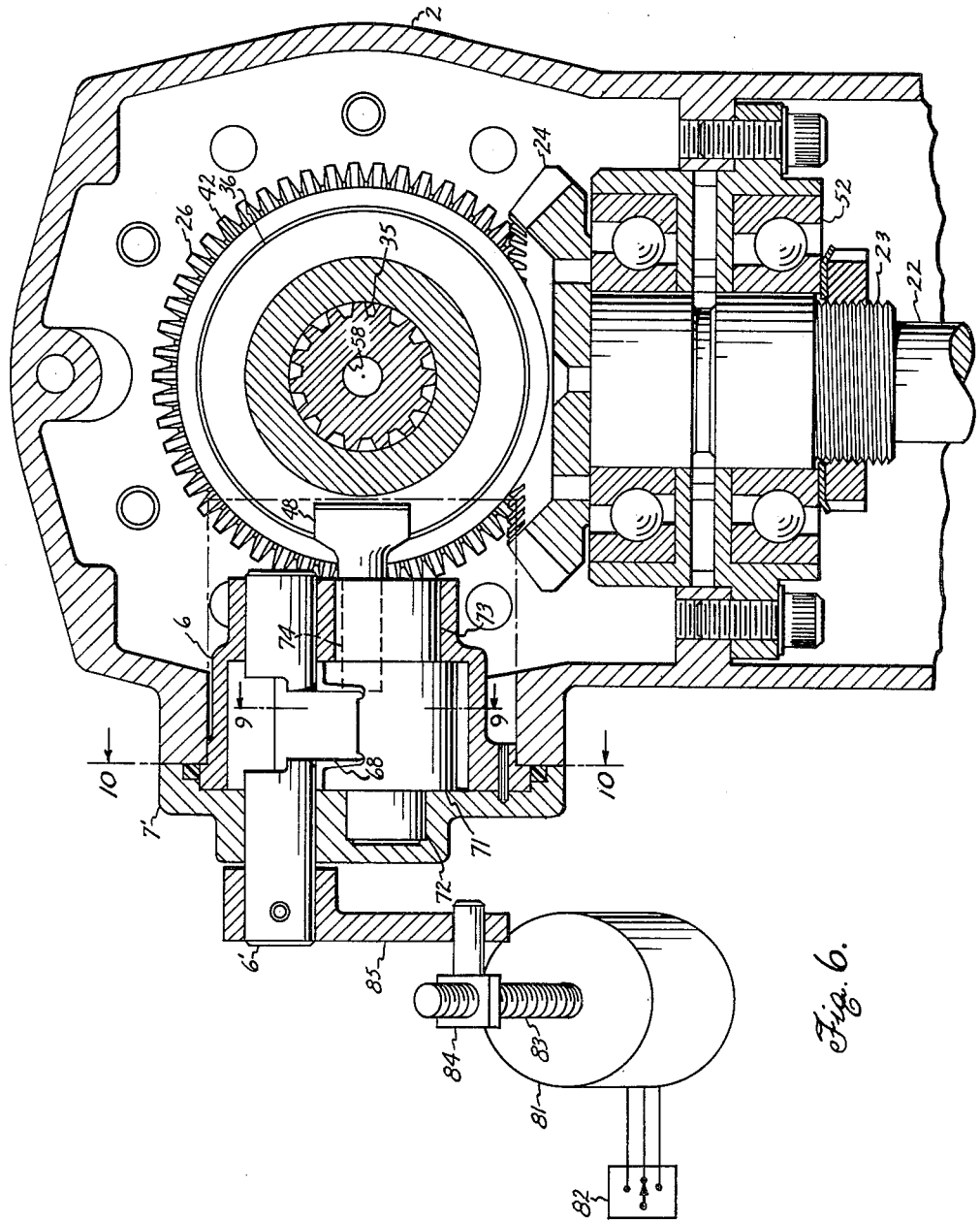
FIG. 6 is a top sectional view taken generally along line 6—6 of FIG. 5 showing reversing mechanism within a housing such as shown in FIG. 1, according to the preferred embodiment of the invention, but showing a modified actuating means for control elements thereof.

The clutch and reversing mechanism interiorly of the housing portion 2 is shown in FIGS. 4, 5 and 6 and includes a drive or input shaft 22 connecting from an engine (not shown) and to which is fixedly connected a bevelled input gear wheel 24 which is constantly in mesh with upper and lower bevelled gear wheels 25 and 26. Gear wheel 25 is freely rotatable with respect to the housing portion 2, being mounted on inner race 27 of a ball bearing 28, and gear wheel 26 is similarly arranged, being mounted on race 29 of bearing 30. A vertical output shaft 31, comprising splines 32 at its lower end to which a propeller may be operatively coupled by suitable means (not shown), is disposed axially within gear wheels 25 and 26 and freely rotatable with respect thereto as a result of the provision of suitable needle or roller bearings 33 and 34 inwardly of the gear wheels for mounting the shaft. Between the bearings 33 and 34, shaft 31 is provided with helically or spirally extending splines or screw threads 35 carrying, threadedly engaged thereon, a circular nut or sleeve member 36. The sleeve member 36 is provided at its ends with respective convex frusto-conical clutch face portions 37 and 38 which are adapted and proportioned fittingly to engage, selectively, with concave frusto-conical clutch face portions 39 and 40 of respective upper and lower clutch elements 41 and 42. Element 41 is drivingly connected to upper gear wheel 25 by means of interengaging threads of the wheel and element as seen at 43, and the lower element 42 is similarly connected to wheel 26 as seen at 44. The fit between each clutch element and its respective gear wheel is sufficiently tight that the element is retained in engagement with a portion of the wheel. Specifically, element 41 remains in engagement with a lower surface portion 45 of wheel 25 by the close fit and does not fall away under its own weight when otherwise free to do so. The elements 41 and 42 and the respective wheels 25 and 26 may, however, be screwed apart to permit replacement of the clutch elements when necessary.

The sleeve 36 may move along the threaded portion 46 of shaft 31 from a position centered between clutch elements 41 and 42, which position is shown in the drawings, into an upper position in which face portion 37 of the sleeve engages clutch face 39 of the clutch element 41 and alternatively and selectively into a lower position in which face portion 38 of the sleeve engages clutch face 40 of the lower clutch element 42. To control such movements of the sleeve, means are provided which include a circular slot or groove 47 extending completely around the sleeve 36 in which is disposed a shoe 48. The shoe is so connected for movement in response to movement of control shaft 6' that upon rotation of the shaft 6' a few degrees in one direction, the shoe will be caused to rise and, through engagement of the shoe against the upper ring surface 49 of groove 47, the sleeve 36 will be raised to bring faces 37 and 39 into engagement. Such engagement may cause, for example, rotation of shaft 31 in a direction to drive the propeller in a reverse direction. When sleeve 36 is centered, the output shaft is not driven and the reversing clutch is in neutral. Rotation of shaft 6' in a direction to lower shoe 48 below neutral position will cause engagement of surfaces 38 and 40 which would result in the driving of shaft 31 in a forward drive direction, since gear wheels 25 and 26 are continuously driven from gear 24 in respectively opposite directions of rotation.

Gear wheel 26 will be seen to carry a small hollow spur gear 50 disposed therebelow and surrounding shaft 31, being freely rotatable around the shaft. Since gear 50 rotates continuously in the same direction as gear wheel 26, it may be conveniently employed to operate an oil pump for supplying oil under pressure in a conduit 51, in the manner explained in the aforementioned patent. Oil under pressure in source 51 is utilized to lubricate ball bearings 52 and 53 which mount the input shaft 22 and input gear wheel 24. The oil so supplied further flows through a conduit 54 provided in the input shaft 22 and input gear wheel 24 and issues from opening 55 in wheel 24 toward the sleeve 36. Oil is also supplied through a conduit 56 in housing portion 2 to a small chamber 57 above the shaft 31 and from this chamber the oil enters a conduit 58 extending axially through shaft 31. Several branch conduits are drilled radially in shaft 31, as indicated at 59 and 60, to provide oil from conduit 58 to lubricate the several bearings, and a branch conduit 61 is provided in portion 46 of the shaft to supply lubricating oil to the threads 35. Suitable restricting means 62, which may be a part of the propeller driving mechanism, restricts the flow of oil from the lower end of conduit 58 to maintain sufficient oil pressure in the conduit. Return of oil which has lubricated bearings, gears, threads and clutch surfaces in housing portion 2 may be returned to a suitable sump through conduits such as conduit 63. Oil dip stick 64 closes an oil fill passageway 65.

The oil issuing from opening 55 lubricates the smooth surfaces 49 and 66 of groove 47 and shoe 48 to reduce friction therebetween to a minimum value. The oil so issuing from opening 55, together with oil draining down from bearings 33 and 28, also coats such of the clutch faces 37, 38, 39 and 40 as are not at the time in firm engagement for purposes and in a manner as best explained in connection with FIGS. 7 and 8.

As seen in FIG. 7, the clutch member or element 41 is provided on its concave clutch face portion 39 with a large number of minute threads 66. Such threads are shown in FIG. 8 greatly enlarged. The threads may be, for example, about 50 to the inch and about 0.01 inch in height, and should be proportioned to retain a supply of oil in the grooves between the threads sufficient to cushion the original contact with a sleeve clutch face, such as face 37. Centrifugal force assists in the supplying of oil to the clutch faces 39 and 40, and the provision of the minute screw threads 66 on these faces prevents the centrifugal force from throwing too much of the oil off of the faces.

Figure 9:
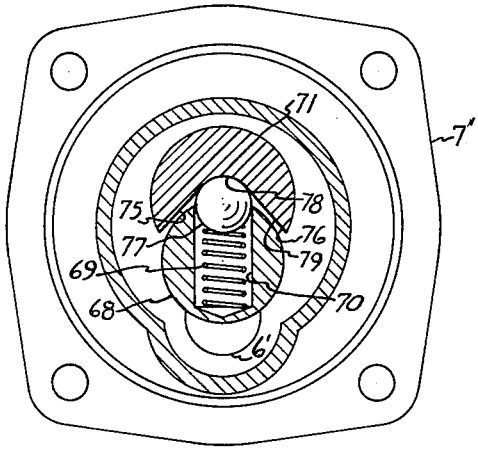
FIG. 9 and FIG. 10 are detail sectional views taken generally along line 9—9 and line 10—10, respectively, of FIG. 6, and FIG. 11 and FIG. 12 are similar corresponding views, showing control mechanism for the reversing mechanism in respectively different operative positions.
Figure 10:
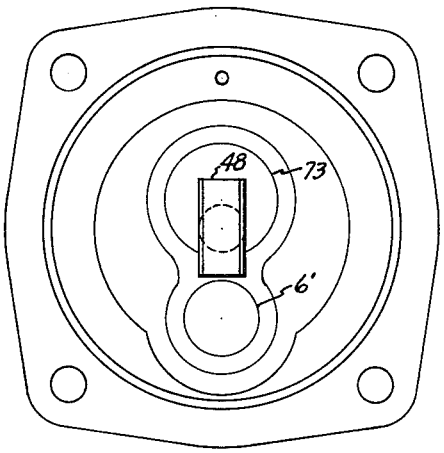
Figure 11:
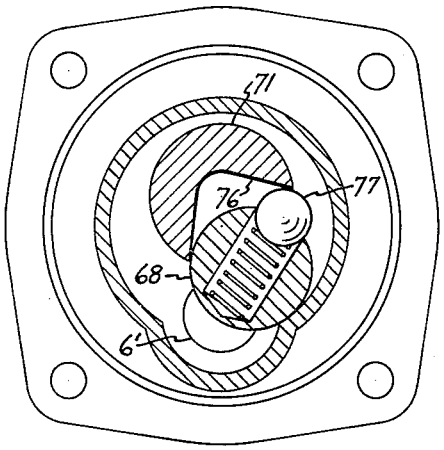
Figure 12:
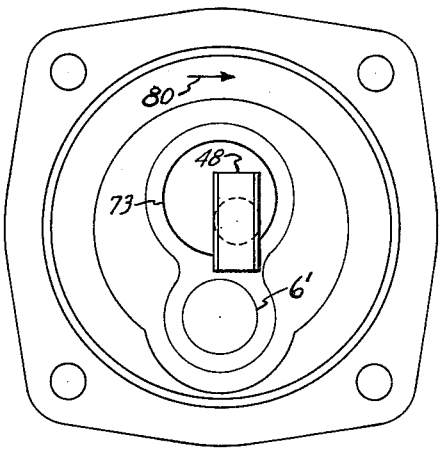

The portions of the shifting or control mechanism generally indicated at 67 which are mounted to plate 7', and which include arm 5' and shaft 6', are best understood with reference to FIGS. 9 and 10 showing the control elements in neutral centered position and FIGS. 11 and 12 showing the control in forward drive position. The shaft 6' has an offset portion 68 carrying a compression spring 69 seated in a cavity 70 thereof and positioned to apply force to a rotatable shaft member 71, to which shoe 48 is mounted eccentrically. The shoe is, accordingly, raisable and lowerable to raise and lower sleeve 36 in response to rotation of shaft 71 on its journals 72 and 73. Shoe 48 is rotatably mounted to member 71 so as to be free to swing as shown at 74 into a horizontal position parallel to groove 47.

Spring 69, the force of which is applied to the surfaces 75, 76 of member 71 through an anti-friction element shown as ball 77, constitutes a spring-loaded lost-motion over-center coupling between arm 5' and shoe 48 and further as a centering detent. Ball 77 in the neutral position of FIGS. 9 and 10 engages in the bottom 78 of notch 79 beyond the rotational axis of member 71 established by journals 72, 73 and, accordingly, when shaft 6' is in its centered position, member 71 is urged into and retained in centered position by spring 69. In this position, shoe 48 is centered and sleeve 36 is centered and out of engagement with clutch members 41 and 42. Upon swinging of arm 5' and rotation of shaft 6', ball 77 is moved outwardly along a respective one of surfaces 75, 76 and, upon passing a dead center position, urges the member 71 to rotate on its journals in a direction corresponding to the direction of swing of arm 5'. In FIGS. 11 and 12 shaft 6' has been rotated about thirty degress from centered position clockwise as viewed in FIG. 11 and ball 77 has traveled outwardly along notch surfaces 76. The force of spring 69 is, accordingly, tending to rotate, and is shown as having been effective to rotate, member 71 from its centered position thus to displace shoe 48, as shown in FIG. 12. This displacement, which would correspond to an upward displacement of the shoe 48 in FIGS. 4–6, upward being represented by the direction of arrow 80 in FIG. 12, would move sleeve 36 into engagement with reverse drive clutch element 42. Swinging of arm 5' in the opposite direction from centered position to lower shoe 48 would have resulted in engagement of sleeve 36 with clutch element 41 to drive the shaft 31 in drive direction.

It will now be seen that the shoe 48 may be mounted and controlled in position by the mechanism of FIGS. 1–3 or by the mechanism of FIGS. 4–12. Each operates to raise and lower shoe 48 which is disposed in groove 47.

The arm 5 of the control arrangement of FIGS. 1–3 is connected to the control cable 15 through a spring-loaded lost-motion connection, as provided by springs 16 and 17. Arm 5', or arm 85, of the control arrangement according to FIGS. 4–12 is connected to shoe 48 through a spring-loaded lost-motion connection, as provided by spring 69. The control elements connecting between cable 15 and arm 5 in FIG. 1 may be utilized to control arm 5' as shown in FIGS. 4 and 5, or to control arm 85 of FIG. 6, each of which is associated with mechanism as shown in FIGS. 9–12. However, it is not necessary that there should be two spring-loaded, lost-motion connections between control cable 15 and shoe 48 and, accordingly, whereas when the mechanism of FIGS. 2 and 3 is employed, it is desirable to provide the lost motion connection with springs 16 and 17 between rod 9 and cable 15, such connection may be direct, such as by a direct pivotal connection between rod 9 and lever 12, when the mechanism of FIGS. 9–12 is used. It is important that at least one lost-motion spring-loaded device be included in the control since adjustments for proper engagement of the clutch are much less critical if a spring is employed which will always provide substantially the same force against the sleeve, and thus between the engaging clutch faces. Obtaining of precise movements by remote control cable 15, which also operates a reverse lock tab 14, would not be practicable. It is necessary, accordingly, to provide between the remote control means and the sleeve 36 some arrangement whereby a control movement may be translated into sleeve movement into predetermined engagement with one or the other clutch element or into neutral, and which will compensate for wear of clutch faces, shoe 48 or other parts. Several lost-motion spring-loaded connection arrangements have been described herein, and these have been shown in several instances as being in series. It is not, however, necessary that there be two or three lost-motion spring-loaded connections in series, and the springs 16 and 17 might be omitted and rod 9 directly connected to lever 12 so long as spring 69 is retained in mechanism 67, and, alternatively, a direct connection between shaft 6 and shoe 48 as shown in FIGS. 2 and 3 is satisfactory so long as springs 16 and 17 are retained. As another alternative, spring 10, slot 11 and pin 9' provide spring-loaded last-motion such that springs 16 and 17 may be replaced by a fixed pivot and arm 5 may be directly connected to shoe 48 as shown in FIGS. 2 and 3.

Other means may be employed to rotate the shaft which eccentrically mounts shoe 48. As specifically shown in FIG. 6, a reversible electric motor 81, connected for operation from a remote reversing and on-off switch and power supply 82, may be provided with a threaded shaft 83 carrying a nut 84 which is coupled to a control arm. The control arm 85 is then fixedly mounted to a shaft 6'. Since control shaft 6' is connected through spring 69 to shoe 48, lost motion is thus provided. Alternatively, the nut 84 may be coupled to an arm corresponding to arm 5 of FIG. 1 if the motor is arranged to have a maximum torque of appropriate value to exert the required force on the sleeve 36 and no more than that proper maximum force.

As explained above, downward movement of shoe 48 results in downward movement of sleeve 36 along threaded portion 46 of shaft 31. As face 38 approaches face 40, since clutch faces 38 and 40 are covered with oil, any tendency of driving clutch face 40 to grab the face 38 and to cause undesirably abrupt acceleration of member 36 is minimized. As the oil layer or film works out from between faces 39 and 40, the frictional contact therebetween gradually increases and increasing torque is thus gradually applied by the driving face 40 to the driven face 38. The orientation of the spiral threads 46 on shaft 31 is so related to the direction of rotation of gear wheel 26 that the torque applied to sleeve 36 as it engages clutch element 42 is in a direction tending to screw sleeve 36 downward on the shaft. Referring to FIG. 4, the shaft 31 is seen to carry left hand threads 35. Accordingly, the gear wheel 26 is driven in a direction which is counter-clockwise as viewed from above. Correspondingly, gear wheel 25 as shown in FIG. 4 is driven in rotation by wheel 24 in a direction which is clockwise as viewed from above and, if sleeve 36 is raised to engage upper clutch element 41, the torque applied to the sleeve would be in a direction to screw the sleeve upwardly on the shaft. It will be recognized that the directions of rotation and the hand of the threads 46 are relative, and that changing the directions of rotation of gear wheels 25 and 26 would require changing the hand of the threads 46. It has also been assumed that the propeller would be driven in a forward direction when shaft 31 rotates in the direction of gear wheel 25, but the arrangement could be the reverse. It may be noted that locking tab 14 on lever 12 should move down if it is to function as in the above patent when the propeller is driven in reverse, and that, accordingly, upward movement of rod 9 and arm 5 should correspond to reverse drive connection. In the arrangement shown, upward swinging of arm 5 or arm 5' results in downward movement of shoe 48 and, accordingly, the propeller should be so connected to shaft 31, and the engine or other power source should be so connected to input shaft 22, that forward propeller rotation results from engagement of sleeve 36 with the lower clutch element 42.

Figure 15:
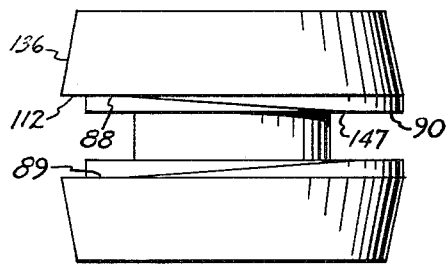
FIG. 15 is a detail view of an element of the embodiment of FIGS. 13 and 14.
Figure 14:
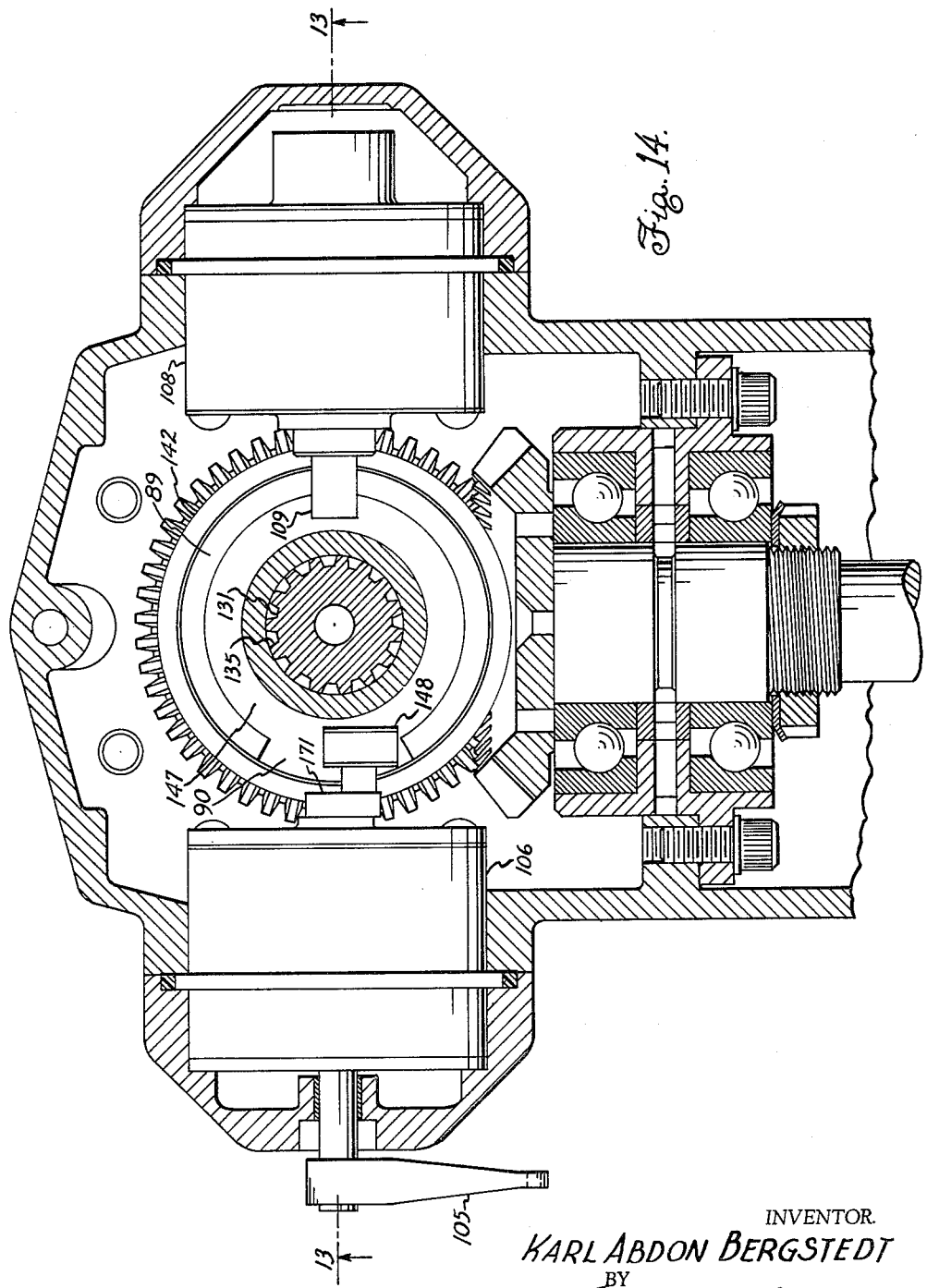
FIG. 14 is a top sectional view of the first modified embodiment taken generally along line 14—14 of FIG. 13.

FIGS. 13, 14 and 15 show a modified sleeve 136, corresponding generally to sleeve 36, and cooperative with clutch elements 141 and 142 in the manner in which sleeve 36 cooperates with elements 41 and 42. Sleeve 136, however, is provided with a regular rectangular waist groove 147 corresponding to groove 47, in which is disposed a similar shoe 148, and also with widened outer cam groove surfaces 88 and 89 conforming in separation to the width of groove 147 at one part 90 of the groove 147. Shoe 148 remains at all times in straight groove 147, and the shoe is eccentrically mounted on a shaft 171 which may be rotated by an external attached arm 105 corresponding to an arm 5 or 5'. Swinging of arm 105 by remote control means will raise and lower sleeve 136. According to this embodiment, means are provided for electric control of shaft 171 in the form of a turning solenoid 106. This turning solenoid is arranged to provide, when excited, a lifting movement to shoe 148 for reverse drive connection through the clutch element 141, reliance being had on the weight of sleeve 136 to fall by gravity toward element 142 when permitted to do so. A power supply and switch unit 107 is connected to turning solenoid 106 selectively to operate the solenoid to raise shoe 148 or to deenergize the solenoid. Arm 105 will be free or omitted if turning solenoid 106 is employed, or it may be useful for emergency manual control of the sleeve position if solenoid 106 fails.

Opposite to solenoid 106, a sliding solenoid 108 is arranged which has an armature 109 urged upon excitation of the solenoid, thereby to attract magnetic portion 109' of the armature against the force of compression spring 110, toward a position within groove 147. When the armature is so disposed, the sleeve is in neutral position. Deenergization of sliding solenoid 108, by operation of remote switch and power supply 111, causes spring retraction of armature 109 completely away from sleeve 136 and out of contact with all groove walls, including walls 88 and 89. If the turning solenoid 106 is now in deenergized condition, sleeve 136 falls by its own weight into contact with clutch element 142, and output shaft 131 is driven in a forward drive direction. If solenoid 106 is energized, however, upon unlocking of the sleeve by retraction of sliding armature 109, the sleeve is raised by the turning solenoid 106 into contact with clutch element 141 to establish a reverse drive connection. If, when sleeve 136 is in driving connection with either of elements 141 or 142, the sliding solenoid 108 is energized by operation of switch 111, the armature 109 moves forward in between walls 88 and 89 when the part 112 thereof aligns with the armature. The part 112 is that part at which walls 88 and 89 have the greatest separation. Now, with armature 109 extending between walls 88 and 89, continued rotation of sleeve 136 causes wall 88 to ride along armature 109 if the sleeve was in lower, direct drive position, or causes wall 89 to ride along the armature if the sleeve was in upper position, until the sleeve has been moved, by the camming action of the respective wall 88 or 89 against the armature, into a neutral position. When the sleeve has been moved along shaft 131 into its neutral position, armature 109 will be engaged between the walls 88, 89 at part 90 and may thus advance into the straight rectangular waist groove 147, locking the sleeve in neutral for so long as the sliding solenoid 108 continues energized.

Other portions of the mechanism being in accord with the descriptions given above, with the exception of modified housing outline and similar minor variations, it is believed that the construction will be understood therefrom. It will be noted that sleeve 136 is disposed on a portion of shaft 131 which carries screw threads 135 corresponding to threads 35 of the other illustrated embodiments.

In connection with operation of FIGS. 13–15, it will be apparent that the camming action of wall 89 against armature 109 will be sufficient to overcome the force of the turning solenoid 106 and thus to return the sleeve from reverse drive position to neutral position even though the turning solenoid remained energized, although the turning solenoid is preferably deenergized before energization of sliding solenoid 108. It will also be apparent that, should shaft 171 be connected for remote control in the manner described in connection with any of FIGS. 1–12, the spring-loaded lost motion connection provided in such control will and should be so designed as to permit the return of the sleeve 136 from reverse or forward drive positions to neutral by the camming action of the respective wall 89 or 88.

While only certain preferred embodiments of this invention have been shown and described by way of illustration, many modifications will occur to those skilled in the art and it is, therefore, desired that it be understood that it is intended in the appended claims to cover all such modifications as fall within the true spirit and scope of this invention.

What is claimed as new and what it is desired to secure by Letters Patent of the United States is:

1. In a clutch mechanism comprising an output shaft, a continuously driven clutch element freely rotatably disposed on said shaft, and a coupling sleeve splined on said shaft and movable therealong toward and away from said clutch element, said sleeve having a circumferentially and radially extending surface portion and facing away from said element disposed in a plane normal to the axis of said sleeve, a shoe engageable with said surface portion, means for moving said shoe in a direction toward said element and bearing against said surface portion thereby to move said sleeve into engagement with said element, a camming surface portion extending around said sleeve, said camming surface portion facing toward said element and having one part nearer said element than another part, positioning means, and cam engaging means positionable by said last means into engagement with said other part of said camming surface and operative upon rotation of said sleeve to cam said sleeve away from engagement with said clutch element.

2. The combination according to claim 1 wherein said shoe moving means comprises a spring-loaded lost-motion connection.

3. The combination according to claim 1 wherein said shoe moving means comprises a spring-loaded lost-motion overcenter connection.

4. The combination according to claim 1 wherein said shoe moving means comprises a remote controlled turning solenoid including a rotatable shaft, said shoe being eccentrically mounted on said shaft, and wherein said positioning means comprises a remote controlled sliding solenoid including an armature integral with said cam engaging means.

5. In a reversing mechanism wherein two reverse rotating continuously driven elements are disposed spacedly along an output shaft and a sleeve member is disposed between said elements coaxial with and splined to said shaft and selectively movable along said shaft into respective positions in driven engagement with one and the other of said elements and into a neutral position out of engagement with either of said elements, means for positioning said sleeve member comprising, a pair of outer groove walls extending aronud said sleeve between its ends, a pair of inner groove walls defining a groove around said sleeve opening outwardly into said outer groove, the walls of said inner groove lying in planes normal to the axis of said sleeve and shaft, each said outer groove wall having a first portion aligned with a respective inner groove wall and a second portion spaced along the grooves which is displaced from the respective inner groove wall toward a respective end of the sleeve, a shoe in said inner groove, means to move said shoe selectively in directions along said shaft operative to move said sleeve selectively into its said respective driven engagement positions, a sleeve centering member aligned with said inner groove when said sleeve is in its neutral position, yieldable means to advance said centering member radially of said sleeve from an outer disengaged position into said outer groove when said sleeve is in either said driven engagement position as the second portion of the respective outer groove wall aligns therewith, thereby with rotation of said sleeve to cause such wall to ride along said centering member and thus to cam said sleeve into neutral position, said yieldable means being operative to advance said centering member into said inner groove when said first portion of the respective outer groove wall meets said centering member.

6. In a clutch mechanism, a driving element rotary on a predetermined axis and having a coaxial frusto-conical metallic clutch face, a driven element rotary on said axis and having a coaxial frusto-conical metallic clutch face for registering engagement with said first face, means for moving one of said elements toward and away from the other thereby to engage and disengage said faces, one of said faces being provided with minute screw threads, and means to supply oil to said one clutch face.

7. The combination according to claim 6 wherein said one clutch face which is provided with said minute screw threads is concave and the other said face is convex.

8. In a reversing device wherein two clutch elements are freely rotatably disposed in spaced positions on an output shaft and driven by drive means in respectively opposite directions of rotation, helical splines on said shaft between said clutch elements, a sleeve provided with a respective clutch face at each end and disposed on said shaft between said elements threadedly engaged on said splines, means for moving said sleeve twistingly along said shaft on said splines selectively between a forward drive position with one said face and one said element in engagement, a reverse drive position with the other said face and other said element in engagement and an intermediate neutral position with said faces and elements out of engagement, said splines being so oriented and arranged that torque imparted to said sleeve upon engagement of either said element with the corresponding clutch face tends to screw said sleeve along said splines in the direction toward the engaged element, said sleeve moving means comprising an element engageable with said sleeve and means including a spring-loaded lost-motion device for moving said element in opposite directions toward said respective clutch elements and imposing respective forces on said sleeve toward said respective elements of predetermined limited maximum value.

9. A reversing clutch comprising a shaft, a pair of spaced gears freely rotatable on said shaft, a drive gear disposed generally between and meshed with said gears of said pair for driving said gears of said pair in respectively opposite directions of rotation, said gears of said pair each having a respective clutch face on the side thereof disposed toward the other gear of the pair, a sleeve member disposed on said shaft between said clutch faces and having a clutch face at each of its opposite ends each selectively engageable with the clutch face of a respective said gear, means to move said sleeve member along said shaft selectively toward and away from said respective gears, said shaft between said gears having external helical threads thereon and said sleeve member having threads in mesh therewith, said threads being oriented to urge said sleeve member in the direction toward the clutch face of one of said gears when the respective sleeve member clutch face is engaged thereagainst in response to the rotational force applied by the face of such gear to said sleeve member, said sleeve member moving means comprising a shoe engageable with said sleeve and means for moving said shoe.

10. A reversing clutch comprising a shaft, a pair of spaced gears freely rotatable on said shaft, a drive gear disposed generally between and meshed with said gears of said pair for driving said gears of said pair in respectively opposite directions of rotation, said gears of said pair each having a respective clutch face on the side thereof disposed toward the other gear of the pair, a sleeve member disposed on said shaft between said clutch faces and having a clutch face at each of its opposite ends each selectively engageable with the clutch face of a respective said gear, means to move said sleeve member along said shaft selectively toward and away from said respective gears, said shaft between said gears having external helical threads thereon and said sleeve member having internal threads in mesh therewith, said threads being oriented to urge said sleeve member in the direction toward the clutch face of one of said gears when the respective sleeve member clutch face is engaged thereagainst in response to the rotational force applied by the face of such gear to said sleeve member, said sleeve member moving means comprising a shoe engageable with said sleeve, a positively movable control member and a spring-loaded lost-motion connection between said member and said shoe.

References Cited by the Examiner

UNITED STATES PATENTS

| 2,382,570 | 8/45 | Kraft | 192—113.2 |
| 2,856,050 | 10/58 | Mathews | 192—113.2 |

FOREIGN PATENTS

| 1,150,084 | 7/57 | France. |
| 1,025,927 | 3/58 | Germany. |

DON A. WAITE, *Primary Examiner.*